United States Patent
Schultz et al.

(10) Patent No.: US 9,773,254 B1
(45) Date of Patent: *Sep. 26, 2017

(54) METHOD AND SYSTEM FOR PROVIDING AN EVENT SPACE ASSOCIATED WITH A PRIMARY VIRTUAL SPACE

(71) Applicant: KABAM, INC., San Francisco, CA (US)

(72) Inventors: Stephanie K. Schultz, San Francisco, CA (US); Michael C. Caldarone, Palo Alto, CA (US); Ken Go, San Mateo, CA (US)

(73) Assignee: Kabam, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/425,061

(22) Filed: Feb. 6, 2017

Related U.S. Application Data

(63) Continuation of application No. 13/865,906, filed on Apr. 18, 2013, now Pat. No. 9,613,179.

(51) Int. Cl.
*A63F 9/24* (2006.01)
*G06Q 30/02* (2012.01)

(52) U.S. Cl.
CPC .... *G06Q 30/0209* (2013.01); *A63F 2300/407* (2013.01); *A63F 2300/535* (2013.01);
(Continued)

(58) Field of Classification Search
None
See application file for complete search history.

(56) References Cited

U.S. PATENT DOCUMENTS 5,816,918 A    10/1998   Kelly
5,933,813 A     8/1999   Teicher
(Continued)

FOREIGN PATENT DOCUMENTS

KR    1020130137431    12/2013
WO        0226333      1/2002
(Continued)

OTHER PUBLICATIONS

Quest item—WoWWiki—Your guide to the World of Warcraft, printed from http://www.wowwiki.com/Quest_Item, Retrieved on Apr. 16, 2014, 1 page.
(Continued)

*Primary Examiner* — Jason Yen
(74) *Attorney, Agent, or Firm* — Sheppard Mullin Richter & Hampton LLP

(57) ABSTRACT

An approach to facilitate providing an event space associated with a primary virtual space is provided. An event space is provided to users of a primary virtual space, wherein the event space comprises one or more event objectives. Users of the primary virtual space having primary user accounts have associated event space accounts indicating event user parameters, event game parameters, and event inventory information for the first user. The user may be provided with event virtual items for purchase wherein the event virtual items are used in the event space during the event period. In response to a determination of the progress of the user associated with one or more event objectives an event award is determined for distribution to the user, wherein the event award may be used within the primary virtual space.

20 Claims, 3 Drawing Sheets

(52) U.S. Cl.
CPC . *A63F 2300/5573* (2013.01); *A63F 2300/575* (2013.01); *A63F 2300/609* (2013.01); *A63F 2300/807* (2013.01)

(56) References Cited

U.S. PATENT DOCUMENTS

| | | | |
|---|---|---|---|
| 5,964,660 A | 10/1999 | James |
| 6,142,472 A | 11/2000 | Kliebisch |
| 6,190,225 B1 | 2/2001 | Coleman |
| 6,402,619 B1 | 6/2002 | Sato |
| 6,561,904 B2 | 5/2003 | Locke |
| 6,604,008 B2 | 8/2003 | Chudley |
| 6,745,236 B1 | 6/2004 | Hawkins |
| 6,811,483 B1 | 11/2004 | Webb |
| 6,850,900 B1 | 2/2005 | Hare |
| 6,928,474 B2 | 8/2005 | Venkatesan |
| 7,050,868 B1 | 5/2006 | Graepel |
| 7,076,453 B2 | 7/2006 | Jammes |
| 7,156,733 B2 | 1/2007 | Chiang |
| 7,192,352 B2 | 3/2007 | Walker |
| 7,197,352 B2 | 3/2007 | Gott |
| 7,326,115 B2 | 2/2008 | Baerlocher |
| 7,381,133 B2 | 6/2008 | Thomas |
| 7,533,336 B2 | 5/2009 | Jaffe |
| 7,660,740 B2 | 2/2010 | Boone |
| 7,682,239 B2 | 3/2010 | Friedman |
| 7,698,229 B2 | 4/2010 | Hsu |
| 7,785,188 B2 | 8/2010 | Cannon |
| 7,813,821 B1 | 10/2010 | Howell |
| 7,819,749 B1 | 10/2010 | Fish |
| 7,945,802 B2 | 5/2011 | Hamilton, II |
| 7,959,507 B2 | 6/2011 | Cannon |
| 8,010,404 B1 | 8/2011 | Wu |
| 8,016,668 B2 | 9/2011 | Hardy |
| 8,047,909 B2 | 11/2011 | Walker |
| 8,057,294 B2 | 11/2011 | Pacey |
| 8,066,571 B2 | 11/2011 | Koster |
| 8,105,156 B2 | 1/2012 | Walker |
| 8,147,340 B2 | 4/2012 | BrunetdeCourssou |
| 8,157,635 B2 | 4/2012 | Hardy |
| 8,187,101 B2 | 5/2012 | Herrmann |
| 8,226,472 B2 | 7/2012 | Van Luchene |
| 8,231,453 B2 | 7/2012 | Wolf |
| 8,231,470 B2 | 7/2012 | Feeney |
| 8,239,487 B1 | 8/2012 | Hoffman |
| 8,246,439 B2 | 8/2012 | Kelly |
| 8,272,934 B2 | 9/2012 | Olive |
| 8,272,951 B2 | 9/2012 | Ganz |
| 8,272,956 B2 | 9/2012 | Kelly |
| 8,282,491 B2 | 10/2012 | Auterio |
| 8,287,367 B2 | 10/2012 | Hall |
| 8,287,383 B1 | 10/2012 | Etter |
| 8,287,384 B2 | 10/2012 | Auterio |
| 8,292,743 B1 | 10/2012 | Etter |
| 8,313,372 B2 | 11/2012 | Naicker |
| 8,317,584 B2 | 11/2012 | Aoki |
| 8,317,601 B1 | 11/2012 | Luciano, Jr. |
| 8,323,110 B2 | 12/2012 | Shibamiya |
| 8,328,642 B2 | 12/2012 | Mosites |
| 8,332,260 B1 | 12/2012 | Mysen |
| 8,332,544 B1 | 12/2012 | Ralls |
| 8,348,716 B2 | 1/2013 | Ganz |
| 8,348,762 B2 | 1/2013 | Willis |
| 8,348,767 B2 | 1/2013 | Mahajan |
| 8,348,768 B2 | 1/2013 | Auterio |
| 8,360,858 B2 | 1/2013 | LaRocca |
| 8,360,866 B2 | 1/2013 | VanLuchene |
| 8,360,867 B2 | 1/2013 | VanLuchene |
| 8,360,868 B2 | 1/2013 | Shvili |
| 8,366,544 B2 | 2/2013 | Walker |
| 8,366,550 B2 | 2/2013 | Herrmann |
| 8,371,925 B2 | 2/2013 | Bonney |
| 8,376,826 B2 | 2/2013 | Katz |
| 8,382,572 B2 | 2/2013 | Hoffman |
| 8,388,427 B2 | 3/2013 | Yariv |
| 8,401,913 B2 | 3/2013 | Alivandi |
| 8,408,989 B2 | 4/2013 | Bennett |
| 8,439,759 B1 | 5/2013 | Mello |
| 8,475,262 B2 | 7/2013 | Wolf |
| 8,506,394 B2 | 8/2013 | Kelly |
| 8,512,150 B2 | 8/2013 | Herrmann |
| 8,533,076 B2 | 9/2013 | Chu |
| 8,583,266 B2 | 11/2013 | Herbrich |
| 8,636,591 B1 | 1/2014 | Hawk |
| 8,758,119 B1 | 6/2014 | BronsteinBendayan |
| 8,777,754 B1 | 7/2014 | Santini |
| 8,784,214 B2 | 7/2014 | Parks |
| 8,790,185 B1 | 7/2014 | Caldarone |
| 8,821,260 B1 | 9/2014 | DeSanti |
| 8,831,758 B1 | 9/2014 | Chu |
| 8,843,557 B2 | 9/2014 | Ranade |
| 8,851,978 B1 | 10/2014 | Koh |
| 8,920,243 B1 | 12/2014 | Curtis |
| 8,961,319 B1 | 2/2015 | Pieron |
| 8,968,067 B1 | 3/2015 | Curtis |
| 9,007,189 B1 | 4/2015 | Curtis |
| 9,138,639 B1 | 9/2015 | Ernst |
| 9,256,887 B2 | 2/2016 | Santini |
| 9,257,007 B2 | 2/2016 | Santini |
| 9,259,642 B1 | 2/2016 | McNeill |
| 9,286,510 B2 | 3/2016 | Soohoo |
| 9,317,993 B2 | 4/2016 | Hardy |
| 9,375,636 B1 | 6/2016 | Wakeford |
| 9,403,093 B2 | 8/2016 | Harrington |
| 9,406,201 B2 | 8/2016 | Englman |
| 9,452,356 B1 | 9/2016 | Tsao |
| 9,452,364 B1 | 9/2016 | Curtis |
| 9,463,376 B1 | 10/2016 | Kim |
| 9,468,851 B1 | 10/2016 | Pieron |
| 9,610,503 B2 | 4/2017 | Pieron |
| 9,626,475 B1 | 4/2017 | Schultz |
| 9,656,174 B1 | 5/2017 | McLellan |
| 9,669,313 B2 | 6/2017 | Pieron |
| 9,682,314 B2 | 6/2017 | Kim |
| 2002/0023039 A1 | 2/2002 | Fritsch |
| 2002/0059397 A1 | 5/2002 | Feola |
| 2002/0094863 A1 | 7/2002 | Klayh |
| 2002/0095327 A1 | 7/2002 | Zumel |
| 2002/0115488 A1 | 8/2002 | Berry |
| 2002/0119824 A1 | 8/2002 | Allen |
| 2002/0165794 A1 | 11/2002 | Ishihara |
| 2002/0183105 A1 | 12/2002 | Cannon |
| 2002/0193162 A1 | 12/2002 | Walker |
| 2003/0008713 A1 | 1/2003 | Ushiro |
| 2003/0032476 A1 | 2/2003 | Walker |
| 2003/0157978 A1 | 8/2003 | Englman |
| 2003/0190960 A1 | 10/2003 | Jokipii |
| 2004/0002387 A1 | 1/2004 | Grady |
| 2004/0068451 A1 | 4/2004 | Lenk |
| 2004/0143852 A1 | 7/2004 | Meyers |
| 2004/0199471 A1 | 10/2004 | Hardjono |
| 2004/0215524 A1 | 10/2004 | Parkyn |
| 2004/0225387 A1 | 11/2004 | Smith |
| 2004/0267611 A1 | 12/2004 | Hoerenz |
| 2005/0096117 A1 | 5/2005 | Katz |
| 2005/0114223 A1 | 5/2005 | Schneider |
| 2005/0165686 A1 | 7/2005 | Zack |
| 2005/0255914 A1 | 11/2005 | McHale |
| 2006/0030407 A1 | 2/2006 | Thayer |
| 2006/0100006 A1 | 5/2006 | Mitchell |
| 2006/0155597 A1 | 7/2006 | Gleason |
| 2006/0200370 A1 | 9/2006 | Ratliff |
| 2006/0217198 A1 | 9/2006 | Johnson |
| 2006/0287102 A1 | 12/2006 | White |
| 2007/0021213 A1 | 1/2007 | Foe |
| 2007/0077988 A1 | 4/2007 | Friedman |
| 2007/0105615 A1 | 5/2007 | Lind |
| 2007/0111770 A1 | 5/2007 | Van Luchene |
| 2007/0129147 A1 | 6/2007 | Gagner |
| 2007/0155485 A1 | 7/2007 | Cuddy |
| 2007/0191101 A1 | 8/2007 | Coliz |
| 2007/0191102 A1 | 8/2007 | Coliz |
| 2007/0213116 A1 | 9/2007 | Crawford |
| 2007/0281285 A1 | 12/2007 | Jayaweera |

(56) References Cited

U.S. PATENT DOCUMENTS

| | | |
|---|---|---|
| 2008/0004093 A1 | 1/2008 | Van Luchene |
| 2008/0032787 A1 | 2/2008 | Low |
| 2008/0076527 A1 | 3/2008 | Low |
| 2008/0113815 A1 | 5/2008 | Weingardt |
| 2008/0124353 A1 | 5/2008 | Brodeur |
| 2008/0154798 A1 | 6/2008 | Valz |
| 2008/0171599 A1 | 7/2008 | Salo |
| 2008/0194318 A1 | 8/2008 | Kralicky |
| 2008/0200260 A1 | 8/2008 | Deng |
| 2008/0214295 A1 | 9/2008 | Dabrowski |
| 2008/0234043 A1 | 9/2008 | McCaskey |
| 2008/0268946 A1 | 10/2008 | Roemer |
| 2008/0275786 A1 | 11/2008 | Gluck |
| 2009/0011812 A1 | 1/2009 | Katz |
| 2009/0017886 A1 | 1/2009 | McGucken |
| 2009/0036199 A1 | 2/2009 | Myus |
| 2009/0048918 A1 | 2/2009 | Dawson |
| 2009/0061982 A1 | 3/2009 | Brito |
| 2009/0082099 A1 | 3/2009 | Luciano |
| 2009/0204907 A1 | 8/2009 | Finn |
| 2009/0208181 A1 | 8/2009 | Cottrell |
| 2009/0210301 A1 | 8/2009 | Porter |
| 2009/0234710 A1 | 9/2009 | Belgaied Hassine |
| 2009/0280905 A1* | 11/2009 | Weisman ............... A63F 13/08 463/40 |
| 2009/0315893 A1 | 12/2009 | Smith |
| 2010/0022307 A1 | 1/2010 | Steuer |
| 2010/0035689 A1 | 2/2010 | Altshuler |
| 2010/0041472 A1 | 2/2010 | Gagner |
| 2010/0050088 A1 | 2/2010 | Neustaedter |
| 2010/0070056 A1 | 3/2010 | Coronel |
| 2010/0094841 A1 | 4/2010 | Bardwil |
| 2010/0099471 A1 | 4/2010 | Feeney |
| 2010/0107214 A1 | 4/2010 | Ganz |
| 2010/0113162 A1 | 5/2010 | Vemuri |
| 2010/0174593 A1 | 7/2010 | Cao |
| 2010/0198653 A1 | 8/2010 | Bromenshenkel |
| 2010/0210356 A1 | 8/2010 | Losica |
| 2010/0227682 A1 | 9/2010 | Reville |
| 2010/0228606 A1 | 9/2010 | Walker |
| 2010/0241491 A1 | 9/2010 | Eglen |
| 2010/0306015 A1 | 12/2010 | Kingston |
| 2011/0045898 A1 | 2/2011 | Anderson |
| 2011/0065511 A1 | 3/2011 | Mahan |
| 2011/0092271 A1 | 4/2011 | Nguyen |
| 2011/0092273 A1 | 4/2011 | Cerbini |
| 2011/0111841 A1 | 5/2011 | Tessmer |
| 2011/0112662 A1 | 5/2011 | Thompson |
| 2011/0113353 A1 | 5/2011 | Koh |
| 2011/0145040 A1 | 6/2011 | Zahn |
| 2011/0212756 A1 | 9/2011 | Packard |
| 2011/0218033 A1 | 9/2011 | Englman |
| 2011/0227919 A1 | 9/2011 | Bongio |
| 2011/0250954 A1* | 10/2011 | Braund ............... A63F 13/69 463/29 |
| 2011/0256936 A1 | 10/2011 | Walker |
| 2011/0281638 A1 | 11/2011 | Bansi |
| 2011/0281654 A1 | 11/2011 | Kelly |
| 2011/0282764 A1 | 11/2011 | Borst |
| 2011/0300923 A1 | 12/2011 | VanLuchene |
| 2011/0319170 A1 | 12/2011 | Shimura |
| 2012/0011002 A1 | 1/2012 | Crowe |
| 2012/0015714 A1 | 1/2012 | Ocko |
| 2012/0015715 A1 | 1/2012 | Luxton |
| 2012/0034961 A1 | 2/2012 | Berman |
| 2012/0040743 A1 | 2/2012 | Auterio |
| 2012/0040761 A1* | 2/2012 | Auterio ............... A63F 13/12 463/42 |
| 2012/0042282 A1 | 2/2012 | Wong |
| 2012/0046111 A1 | 2/2012 | Walker |
| 2012/0047002 A1 | 2/2012 | Patel |
| 2012/0059730 A1* | 3/2012 | Jensen ............... G06Q 30/0601 705/26.1 |
| 2012/0083909 A1 | 4/2012 | Carpenter |
| 2012/0101886 A1 | 4/2012 | Subramanian |
| 2012/0108306 A1 | 5/2012 | Munsell |
| 2012/0109785 A1 | 5/2012 | Karlsson |
| 2012/0115593 A1 | 5/2012 | Vann |
| 2012/0122589 A1 | 5/2012 | Kelly |
| 2012/0130856 A1 | 5/2012 | Petri |
| 2012/0142429 A1 | 6/2012 | Muller |
| 2012/0156668 A1 | 6/2012 | Zelin |
| 2012/0157187 A1 | 6/2012 | Moshal |
| 2012/0166380 A1 | 6/2012 | Sridharan |
| 2012/0166449 A1 | 6/2012 | Pitaliya |
| 2012/0178514 A1 | 7/2012 | Schulzke |
| 2012/0178529 A1 | 7/2012 | Collard |
| 2012/0197874 A1 | 8/2012 | Zatkin |
| 2012/0202589 A1 | 8/2012 | Kelly |
| 2012/0203669 A1 | 8/2012 | Borsch |
| 2012/0215667 A1 | 8/2012 | Ganz |
| 2012/0221430 A1 | 8/2012 | Naghmouchi |
| 2012/0226573 A1 | 9/2012 | Zakas |
| 2012/0231891 A1 | 9/2012 | Watkins |
| 2012/0244947 A1 | 9/2012 | Ehrlich |
| 2012/0244950 A1 | 9/2012 | Braun |
| 2012/0245988 A1 | 9/2012 | Pace |
| 2012/0256377 A1 | 10/2012 | Schneider |
| 2012/0265604 A1 | 10/2012 | Corner |
| 2012/0282986 A1 | 11/2012 | Castro |
| 2012/0289315 A1 | 11/2012 | Van Luchene |
| 2012/0289346 A1 | 11/2012 | VanLuchene |
| 2012/0295699 A1 | 11/2012 | Reiche |
| 2012/0296716 A1 | 11/2012 | Barbeau |
| 2012/0309504 A1 | 12/2012 | Isozaki |
| 2012/0311504 A1 | 12/2012 | vanOs |
| 2012/0322545 A1 | 12/2012 | Arnone |
| 2012/0322561 A1 | 12/2012 | Kohlhoff |
| 2012/0329549 A1 | 12/2012 | Johnson |
| 2012/0330785 A1 | 12/2012 | Hamick |
| 2013/0005437 A1 | 1/2013 | Bethke |
| 2013/0005466 A1 | 1/2013 | Mahajan |
| 2013/0005473 A1 | 1/2013 | Bethke |
| 2013/0005480 A1 | 1/2013 | Bethke |
| 2013/0006735 A1 | 1/2013 | Koenigsberg |
| 2013/0006736 A1* | 1/2013 | Bethke ............... G06Q 30/02 705/14.12 |
| 2013/0012304 A1 | 1/2013 | Cartwright |
| 2013/0013094 A1 | 1/2013 | Parks |
| 2013/0013326 A1 | 1/2013 | Miller |
| 2013/0013459 A1 | 1/2013 | Kerr |
| 2013/0029745 A1 | 1/2013 | Kelly |
| 2013/0036064 A1 | 2/2013 | Osvald |
| 2013/0090173 A1* | 4/2013 | Kislyi ............... A63F 13/69 463/43 |
| 2013/0090750 A1 | 4/2013 | Herrman |
| 2013/0123005 A1 | 5/2013 | Allen |
| 2013/0124361 A1 | 5/2013 | Bryson |
| 2013/0151342 A1 | 6/2013 | Citron |
| 2013/0178259 A1 | 7/2013 | Strause |
| 2013/0217453 A1 | 8/2013 | Briggs |
| 2013/0217489 A1 | 8/2013 | Bronstein Bendayan |
| 2013/0226733 A1 | 8/2013 | Evans |
| 2013/0237299 A1 | 9/2013 | Bancel |
| 2013/0244767 A1 | 9/2013 | Barclay |
| 2013/0260850 A1* | 10/2013 | Carpe ............... A63F 13/79 463/9 |
| 2013/0288757 A1 | 10/2013 | Guthridge |
| 2013/0288787 A1 | 10/2013 | Yoshie |
| 2013/0303276 A1 | 11/2013 | Weston |
| 2013/0324259 A1 | 12/2013 | McCaffrey |
| 2013/0339111 A1 | 12/2013 | Ross |
| 2013/0339228 A1 | 12/2013 | Shuster |
| 2013/0344932 A1 | 12/2013 | Adams |
| 2014/0004884 A1 | 1/2014 | Chang |
| 2014/0011565 A1 | 1/2014 | Elias |
| 2014/0018156 A1 | 1/2014 | Rizzotti |
| 2014/0033262 A1 | 1/2014 | Anders |
| 2014/0038721 A1 | 2/2014 | Archer |
| 2014/0067526 A1 | 3/2014 | Raju |
| 2014/0067544 A1 | 3/2014 | Klish |
| 2014/0073436 A1 | 3/2014 | Takagi |
| 2014/0087864 A1 | 3/2014 | Togashi |
| 2014/0089048 A1 | 3/2014 | Bruich |

(56) References Cited

U.S. PATENT DOCUMENTS

| | | | |
|---|---|---|---|
| 2014/0100020 A1 | 4/2014 | Carroll |
| 2014/0106858 A1 | 4/2014 | Constable |
| 2014/0157314 A1 | 6/2014 | Roberts |
| 2014/0180725 A1 | 6/2014 | Ton-That |
| 2014/0206452 A1 | 7/2014 | Bambino |
| 2014/0243065 A1 | 8/2014 | Wright |
| 2014/0243072 A1 | 8/2014 | Santini |
| 2014/0274359 A1 | 9/2014 | Helava |
| 2014/0295958 A1 | 10/2014 | Shono |
| 2014/0309026 A1 | 10/2014 | Inukai |
| 2014/0329585 A1 | 11/2014 | Santini |
| 2014/0337259 A1 | 11/2014 | Lamb |
| 2015/0011305 A1 | 1/2015 | Deardorff |
| 2015/0019349 A1 | 1/2015 | Milley |
| 2016/0361654 A1 | 12/2016 | Pieron |

FOREIGN PATENT DOCUMENTS

| | | |
|---|---|---|
| WO | 2013013281 | 1/2013 |
| WO | 2013059639 | 1/2013 |
| WO | 2013116904 | 1/2013 |
| WO | 2015013373 | 1/2015 |
| WO | 2015153010 | 10/2015 |
| WO | 2015168187 | 11/2015 |
| WO | 2015179450 | 11/2015 |
| WO | 2015196105 | 12/2015 |

OTHER PUBLICATIONS

"A Wondrous Drop Event and Double EXP", [dated Aug. 22, 2012]. From flyff-wiki. [online], [retrieved on Jan. 12, 2016]. Retrievedfrom the Internet <URL:http://flyff-wiki.webzen.com/wiki/A_Wondrous_Drop_Event_and_Double_EXP>. 2 pages.

"Behavioural Analytics & Campaigning", http://lotaris.com/behavioural._analytics_and._Campaigning.htm, screenshot access date May 24, 2012 2:21 PM, 1 page.

"Building Structures". War2.warcraft.org. Online. Accessed via the Internet. Accessed Aug. 9, 2014. <URL: http://war2.warcraft.org/strategy/verybasics/building.shtml>, 3 pages.

"Clash of Clans". Wikipedia.org. Online. Accessed via the Internet. Accessed Aug. 9, 2014. <URL: http://en.wikipedia.org/wiki/Clash of Clans>, 3 pages.

"Digital River World Payments and Lotaris Partner to Extend Mobile Application Licensing and Monetization Capabilities to Software Publishers", Business Wire Press Release, http://www.marketwatch.com/story/digital-river-world-payments-and-lotaris . . . , posted San Francisco, Mar. 27, 2012 (Business Wire), 8:30 a.m. EDT, printed May 24, 2012 2:32 PM, 3 pages.

"Digital River World Payments and Lotaris Partner to Extend Mobile Application Licensing and Monetization Capabilities to Software Publishers", LOTARIS Press Release, http://www.lotaris.com/digital_river_world_payments_and_lotaris_partne . . . , posted Tuesday, Mar. 27, 2012, screenshop access date May 24, 2012, 2:19 PM, 1 page.

"Flyff", [dated May 25, 2013]. From Wikipedia, The Free Encylopedia. [on line], [retrieved on Jan. 12, 2016]. Retrieved from the Internet<URL:https://en.wikipedia.org/w/index.php?title=Flyff&oldid=556751091 >. 4 pages.

"Gem calculation formulas", forum.supercell.net. Online. Accessed via the Internet. Accessed Aug. 9, 2014. <URL: http://forum.supercell.net/showthread.php/23028-Gem-calculation-formulas>, 3 pages.

"Getting Started" written by BoD, published on Oct. 13, 2011 and printed from URL <http://lotrowiki.com/index.php?title=Getting_Started&oldid=349681 >, 5 pages.

"How Town Hall to Level 4". Forum.supercell.net. Online. Jan. 31, 2013. Accessed via the Internet. Accessed Feb. 21, 2015. URL:http://forum.supercell.net/showthread.php/15052-How-Town-Hall-to-Level-4, 2 pages.

"I don't have enough resources/builders to upgrade anything in my village, what can I do?" gamesupport.supercell.net. Online. Accessed via the Internet. Accessed Aug. 9, 2014. <URL: https://gamesupport.supercell.net/hc/en-us/articles/421482-I-don-t-have-enough-resources-builders-to-upgrade-anything-in-my-village-what-can-I-do->, Apr. 23, 2014, 9 pages.

"Lotro Store" written by Elinnea, published on Dec. 15, 2011 and printed from URL <http://lotrowiki.com/index.php ?title=LOTRO _Store&oldid=396550>, 23 pages.

"Lotro-Wiki.com" (evidence in regards to "Lord of the Rings Oline" MMORPG game), latest Dec. 22, 2011, <http://lotrowiki.com/index.php/Main_Page), http://lotro-wiki.com/index.php?title=LOTRO_Store&oldid=396550, http://lotro-wiki.com/index.php?title=Quest:A_Little_Extra_Never_Hurts_—_Part_1&oldid=399597, http://lotro-wiki.com/index.php?title=Quest:A_Little_Extra_Never_Hurts_—_Part_2&oldid=399366, http://lotro-wiki.com/index.php?title=Getting_Started&oldid=349681, Links are to used articles, 33 pages.

"Main Page" written by Starbusty, published on Dec. 12, 2011 and printed from URL <http://lotrowiki.com/index.php?title=Main_Page&oldid=394429>, 2 pages.

"Quest: A Little Extra Never Hurts—Part 1" written by Zimoon, published on Dec. 22, 2011 and printed from URL <http://lotro-wiki.com/index.php?title=Quest:A_Little_Extra_Never_Hurts_—_Part_1 &oldid=399597>, 3 pages.

"Quest: A Little Extra Never Hurts—Part 2" written by Zimoon, published on Dec. 21, 2011 and printed from URL <http://lotro-wiki.com/index.php?title=Quest:A_Little_Extra_Never_Hurts_—_Part_2&oldid=399366>, 2 pages.

"Scroll of Amplification R", [dated Apr. 26, 2012]. From flyff-wiki. [online], [retrieved on Jan. 12, 2016]. Retrieved from the Internet<URL:http://flyff-wiki.webzen.com/wiki/Scroll_of_Amplification_R>. 3 pages.

"Warcraft II: Tides of Darkness". Wikipedia.org. Online. Accessed via the Internet. Accessed Aug. 9, 2014. <URL: http://en.wikipedia.org/wiki/Warcraft_II:_Tides_of_Darkness>, 10 pages.

<http://lotro-wiki.com/index.php?title=Ouest:A_Little_Extra_Never_Hurts_—_Part_2&oldid=399366>, <http://lotrowiki.com/index.php ?title=Getting_Started&oldid=349681 >. Links are to used articles. (7 pgs) Feb. 26, 2014.

City Coins. CityVille Wikia. Online. Accessed via the Internet. Accessed Aug. 9, 2014. <URL: http://cityville.wikia.com/wiki/City_Coins>, 2 pages.

Elsword—Wikipedia, the free encyclopedia, URL: en.wikipedia.org/wiki/Elsword [Retrieved Feb. 21, 2013], 6 pages.

FriskyMongoose "Happy Island Updates", available Jun. 12, 2012 from https://web.archive.org/web/20120612004417/http://friskymongoose.com/happy-island-updates-new-attractions-decorations-and-limited-edition-item-bundles/, 7 pages.

Gaia "Black Friday Bundle" available on Nov. 23, 2011, from http://www.gaiaonline.com/forum/community-announcements/black-friday-big-bundles-rare-items/t.76127933/, 5 pages.

Hamari, Juho, "Game Design as Marketing: How Game Mechanics Create Demand for Virtual Goods", available on vol. 5, Issue 1, 2010, retrieved from Int. Journal of Business Science and Applied Management—http://www.business-and-management.org/library/2010/5_1-14-29-Hamari,Lehdonvirta.pdf, on May 26, 2015, 16 pages.

Katkoff, Michail, "Clash of Clans—the Winning Formula", Sep. 16, 2012, retrieved from Internet on Sep. 30, 2015 from URL <http://www.deconstructoroffun.com/2012/09/clash-of-clans-winning-formula.html>, 13 pages.

MMO Site "Rose Online Launches the Newest in Game Feature"; available Aug. 11, 2011 from https://web.archive.org/web/20110811231226/http://news.mmosite.com/content/2011-06-21/rose_online_launches_the_newest_in_game_feature.1.shtml, 3 pages.

New Feature: Tiered Tournaments and Tournament Updates, printed from http://community.kabam.com/forums/showthread.php?171349-New-Feat on Feb. 11, 2014, 2 pages.

(56) References Cited

OTHER PUBLICATIONS

Ozeagle, "What happens if . . . answers about account types" on Lotro forum, Jan. 18, 2011,<https://www.lotro.com/forums/showthread.php?377885-What-happens-if-answers-about-the-account-types> (16 pgs).
Path of Exile—Forum—Beta General Discussion—Unique Items Compendium 60/71 URL: web.archive.org/web/20120608004658/http://www.pathofexile.com/forum/view-thread/12056 [Retrieved Jun. 24, 2013], 52 pages.
PCT International Search Report and Written Opinion for PCT/US2016/017637 dated Apr. 7, 2016, 12 pages.
TFWiki "teamfortress wiki" available Nov. 5, 2011 retrieved from https://web.archive.org/web/20111105044256/http://wiki.teamfortress.com/wiki/Loadout, 4 pages.
UBC, "Theory of Auctions" available on Mar. 24, 2012 from https://web.archive.org/web/20120324204610/http:/montoya.econ.ubc.ca/Econ522/auctions.pdf, slide 5, Para. 1.3, 19 pages.
Wiki "Gaia online"', available on Sep. 9, 2011, https://web.archive.org/web/20110927210155/http://en.wikipedia.org/wiki/Gaia_Online, 8 pages.
Wikipedia, Mafia Wars, <http://en.wikipedia.org/wiki/Mafia_Wars>, Jan. 28, 2012, 3 pages.
"Treasure Chest Game" written by Zelda Wiki, the Zelda encyclopedia; published on or before Oct. 17, 2012; accessible andprinted from URL <http://web.archive.org/web/20121017085058/http://zeldawiki.org/Treasure_Chest_Game>, 4 pages.
"Cataclysm Guide: Guild Advancement—Wowhead", http://www.wowhead.com/guide=cataclysm&guilds, printed Dec. 5, 2013, 4 pages.
"Guild Housing System—FlyFF Wiki", http://flyff-wiki.gpotato.com/wiki/Guild_Housing_System, printed Dec. 5, 2013, 5 pages.
"Kabam Community Forums > Kingdoms of Camelot > Kingdoms of Camelot Open Discussion > Open Discussion : Tournament of Might Prizes / Main Discussion thread", printed from http://community.kabam.com/forums/archive/index.php/t-43273.html, Oct. 24, 2011, 23 pages.
"Rest—WoWWiki—Your guide to the World of Warcraft", printed from http://www.wowwiki.com/Rest, May 19, 2014, 2 pages.
Diablo 2, Blizzard Entertainment, Mar. 23, 2009, manual and online website, http://web.archive.Org/web/20090323171356/http://classic.battle.net/diablo 2exp/items/basics.shtml, 51 pages.
Dreamslayer's Enchanting and Upgrading Guide—With Pictures:D and Explanations, URL: forums.elswordonline.com/Topic5673.aspx [Retrieved Feb. 21, 2013], 8 pages.
Elsword, Dec. 27, 2007, KOG Studios, Guide posted Mar. 17, 2011, http://forums.elswordonline.com/topic5673.aspx, http://en.wikipedia.org/wiki/Elsword, 16 pages.
Gem System—Street Fighter X Tekken, http://www.streetfighter.com/us/sfxtk/features/gem-system, printed Nov. 6, 2012, 6 pages.
MapleStory, Internet guide: http://maplestory.nexon.net/guides/game-play/systems/00Flk/, http://maplestory.nexon.net/guides/game-play/systems/00Flk, http://maplestory.nexon.net/guides/game-play/systems/00FFV, Sep. 28, 2012, 12 pages.
MapleStory—Guides—Equipment Upgrading 101: Enhancements, URL: maplestory.nexon.net/guides/game-play/systems/OOFlk; [Retrieved Jun. 24, 2013]3 pages.
MapleStory—Guides—Equipment Upgrading 101: Potentials, URL: maplestory.nexon.net/guides/game-play/systems/OOFlj/ [Retrieved Jun. 24, 2013], 5 pages.
MapleStory—Guides—Equipment Upgrading 101: Scrolls, URL: maplestory.nexon.net/guides/game-play/systems/ OOFFV/#mitigating [Retrieved Jun. 24, 2013], 4 pages.
Path of Exile, Internet posting: http://web.archive.org/web/20120606004658/http://www.pathofexile.com/forum/view-thread/12056, Nov. 16, 2011, 52 pages.

\* cited by examiner

METHOD AND SYSTEM FOR PROVIDING AN EVENT SPACE ASSOCIATED WITH A PRIMARY VIRTUAL SPACE

FIELD OF THE DISCLOSURE

This disclosure relates to providing event spaces, in particular providing event spaces associated with one or more primary virtual spaces.

BACKGROUND

Some games are known to have secondary games associated with the primary game. The secondary games typically provide a separate game space where the users of the primary game may participate in one or more actions separate, but typically related, to the primary game. The secondary games may be a simplified version of the primary game where the users are required to achieve one or more objectives. In typical examples, the secondary game may be a player-versus-player scenario, where the players attempt to defeat other players in combat. In such typical examples, the characters associated with the players tend to be normalized across all the players, so that all of the characters have the same or similar capabilities and/or properties. In this way, new players of the primary game having characters with lower capabilities and/or properties than players having advanced characters may interact on a level playing field.

Previously provided secondary games have not provided the ability of a player to receive an advantage in the secondary game by making purchases of virtual items and/or virtual currency. Such limitations of the secondary games miss an opportunity to generate revenue from players when playing the secondary games.

SUMMARY

One aspect of the disclosure relates to providing event spaces, associated with a primary game space, where the event space may be configured to facilitate playing a secondary game. The users interacting with the event space may start the secondary game, within the event space, with characters having the same properties, and the users may be encouraged to achieve one or more objectives within the secondary game. The one or more objectives may be associated with one or more administrator defined events. The users may be provided with incentives to make purchases of virtual currency and/or virtual items associated with the event space such that the users may be provided with one or more advantages in response to making the purchases. Providing incentives to make purchases of virtual currency and/or virtual items associated with the event space provides an opportunity to generate revenue from a user's game play of secondary games.

In some implementations, the system may include one or more servers. The server(s) may be configured to communicate with one or more client computing platforms according to a client/server architecture. The users may access the system and/or a virtual space (e.g., a virtual world, a game space, etc.) via the client computing platforms.

The server(s) may be configured to execute one or more computer program modules to provide an event space associated with a primary virtual space. The computer program modules may include one or more of a primary virtual space module, a primary account module, an event space module, an event account module, an event transaction module, an event assessment module, a reward distribution module, an event configuration module, and/or other modules. In some implementations, the client computing platforms may be configured to execute one or more computer program modules that are the same as or similar to the computer program modules of the server(s) to provide an event space associated with a primary virtual space.

The primary space module may be configured to execute an instance of a primary virtual space. The primary space module may be configured to implement the instance of the primary virtual space to facilitate interaction of the users with the primary virtual space and/or each other by performing operations the primary virtual space in response to commands received from the users. The primary space module may de configured to implement the instance of the primary virtual space to determine view information that defines a view of the primary virtual space for presentation to a first user. The primary space module may be configured to facilitate transmission of the view information to a client computing platform associated with the first user to facilitate presentation of the view primary virtual space to the first user on the client computing platform.

The primary account module may be configured to manage accounts of users related to the primary virtual space. The accounts of the users may include a first primary user account associated with a first user, wherein the first primary user account may include inventory information for the first user which indicates virtual items available to the first user in the primary virtual space.

The event space module may be configured to execute an instance of an event space. The event space module may be configured to implement the instance of the events space to facilitate interactions of the users with the event space and/or each other during an event period by performing operations in the event space in response to commands received from the users. The event space may comprise one or more event objectives. Event objectives may include one or more of player-versus-player objectives, player-versus-environment objectives, and collecting and/or harvesting objectives. The virtual items available to the first user in the primary virtual space may be unavailable to the first user in the event space.

Access to the event space may be limited to a subset of users of the primary virtual space. For example, the event space may only become available to the users of the primary virtual space upon an indication that the users of the primary virtual space have breached a specified threshold. The event space module may be configured to implement the instance of the event space upon an indication that the first user has reached a specified level in the primary virtual space. The specified threshold may be any parameter associated with the user and/or the game.

The event account module may be configured manage accounts of users related to the event space. The user accounts may include a first event user account associated with the first user, wherein the first event user account indicates a set of event user parameters for the first user, a set of event game parameter for the first user, and event inventory information. The event inventory information may indicate virtual items available to the first user in the event space. The event user parameters may include an association of the first event account with the first primary user account. The virtual items available to the first user in the event space may be different than the virtual items available to the first user in the primary virtual space.

The event transaction module may be configured to facilitate purchase of event virtual items useable in the event space. The event inventory information may reflect the availability of the event virtual item to the first user in the event space, in response to the purchase of an event virtual item in the event space by the first user. The event virtual items available to the first user in the event space may be unavailable to the first user in the primary virtual space.

The event assessment module may be configured to determine the progress of the users with respect to the one or more event objectives. The event assessment module may be configured to determine event rewards to be awarded to individual ones of the users based on the progress of the individual users with respect to the one or more event objectives. The event rewards may be usable in the primary virtual space. The event rewarded may be unavailable for use by the first user in the event space.

The reward distribution module may be configured to distribute event rewards to the users in the primary virtual space. The event inventory information in the first primary account may be updated to reflect the availability to the first user in the primary virtual space of one or more virtual items included in the first event reward, in response to the determination of a first event reward for the first user. The rewards awarded to the first user during the event period in the event space may be distributed to the first user for user in the primary virtual space upon expiration of event period, such that, in response to expiration of the event period, the primary account module may be configured to modify the inventory information for the first user to indicate the availability of the event reward for use by the first user in the primary virtual space.

Upon an expiration of the event period, the event space may become unavailable to the users, and the event items purchased by the users in the event space during the event period may be forfeit, such that the event inventory information for the first user may be updated to reflect removal of the availability of the event virtual item(s) in the event space to the first user upon expiration of the event period.

The event configuration module may be configured to facilitate entry and/or selection by an administrator of one or more of: one or more event objectives; one or more virtual items available to the first user in the event space, and one or more event rewards available for awarding to the individual users based on progress of the individual users with respect to one or more event objectives; and other parameters for the event space. The event configuration module may be configured to facilitate entry and/or selection of an event period, during which the event space will be available to users of the primary virtual space.

Users of the event space may be incentivized to make purchases of event items using real currency by requiring users to make a purchase(s) of event items before becoming eligible to receive an event reward. As such, the event configuration module may be configured to facilitate selection and/or entry by the administrator of an amount of real currency required to be spent on event items before the first user is eligible to receive the one or more event rewards. The amount of real currency required to be spent by users may vary in response to an indication of the user's propensity to purchase virtual items with real currency. For example, if the primary user account of the first user indicates that the first user spends a relatively large amount of real currency on virtual items, the amount of real currency required to be spent by the first user before becoming eligible to receive an event reward may be greater than for a second user, where the primary user account of the second user indicates that the second user spends a relatively low amount of real currency on virtual items.

Users of the event space may be incentivized to make purchases of virtual event items in the event space, using real currency, by accelerating the users' progress toward achieving the objective upon a purchase of a virtual event item with real currency. The event assessment module may be configured to determine the progress of the users with respect to one or more event objectives, wherein the event assessment module may determine that the first user has progressed further toward the one or more event objectives in response to a purchase of one or more virtual items by real currency.

The event items, available to the first user in the event space for purchase with real currency may be differentially priced between the users. For example, a first user having a primary user account indicating that the first user has a propensity to make purchases of virtual items with real currency may be presented with a higher price, in virtual or real currency, for the virtual item in comparison to a second user having a primary user account indicating that the second user does not have a propensity to make purchases of virtual items with real currency. As such, the event transaction module may be further configured to determine a user cost to the first user for individual ones of the event items baser upon a purchase history of the first user as indicated in the primary user account for the first user.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
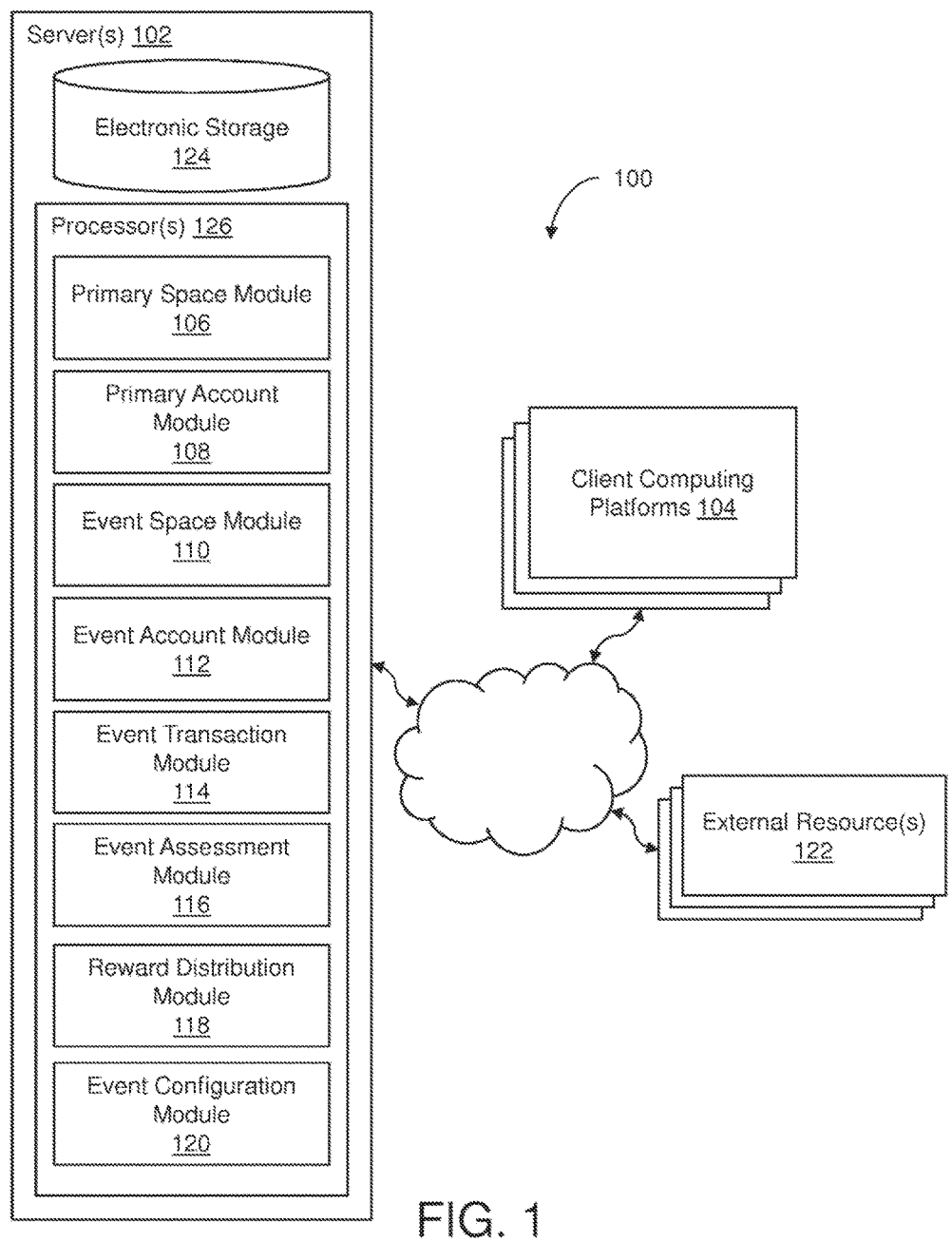
FIG. 1 illustrates a system for providing an event space associated with a primary virtual space, in accordance with one or more implementations.

FIG. 1 illustrates a system 100 configured to provide an event space associated with primary virtual space, in accordance with one or more implementations. The event space may be configured to facilitate playing a secondary game. The users interacting with the event space may start the secondary game, within the event space, with characters having the same properties, and the users may be encouraged to achieve one or more objectives within the secondary game. The one or more objectives may be associated with one or more administrator defined vents. The users may be provided with incentives to make purchases of virtual currency and/or virtual items associated with the event space such that the users may be provided with one or more advantages in response to making the purchases. Providing incentives to make purchases of virtual currency and/or virtual items associated with the event space provides an opportunity to generate revenue from a user's game play of secondary games.

In some implementations, system 100 may include one or more servers 102. Server(s) 102 may be configured to communicate with one or more client computing platforms 104 according to a client/server architecture. The users may access system 100 and/or a virtual space (e.g., a virtual world, a game space, etc.) via client computing platforms 104.

The server(s) 102 may be configured to execute one or more computer program modules to provide an event space associated with a primary virtual space. The computer program modules may include one or more of a primary space module 106, a primary account module 108, an event space module 110, an event account module 112, an event transaction module 114, an event assessment module 116, a reward distribution module 118, an event configuration module 120, and/or other modules. In some implementations, the client computing platforms 104 may be configured to execute one or more computer program modules that are the same as or similar to the computer program modules of the server(s) 102 to provide an event space associated with primary virtual space.

The primary space module 106 may be configured to execute an instance of a primary virtual space. The primary space module 106 may be configured to implement the instance of the primary virtual space to facilitate interaction of the users with the primary virtual space and/or each other by performing operations in the primary virtual space in response to commands received from the users. The primary space module 106 may be configured to implement the instance of the primary virtual space to determine view information that defines a view of the primary virtual space presentation to a first user. The primary space module 106 may be configured to facilitate transmission of the view information to a client computing platform 104 associated with the first user to facilitate presentation of the view the primary virtual space to the first user on the client computing platform 104.

In various implementation, the virtual space may be a game space. As such, an instance a game space may be an instance of a virtual space. Space module 106 may be configured to implement the instance of the virtual space executed by the computer modules to determine views of the virtual space. The instance of the virtual space may reflect the state of the virtual space. The instance of the virtual space may be used to push state information to client computing platforms 104 for implementation on the client computing platforms 104, may be used to verify state information generated on the client computing platforms 104 executing expressions of the instance locally, and/or for other purposes. State information may include information about the state of the virtual space such as, without limitation, position information of one or more objects, topography information, object status/shape information battle information, score information, use or character progress information, user inventory information, progress information for one or more activities or actions, view information describing a view of the virtual space, and/or other information that describes the state of the virtual space.

Expressions of the instance executed on the client computing platforms 104 may be configured to simply present views of the virtual space based on the state information (e.g., via streaming, via object/position data, and/or other information) from server(s) 102 to client computing platforms 104 for presentation to users. The view determined and transmitted to a given client computing platform 104 may correspond to a user character being controlled by a user via the given client computing platform 104. The view determined and transmitted to a given client computing platform 104 may correspond to a location in the virtual space (e.g., the location from which the view is taken, the location the view depicts, and/or other locations), a zoom ratio, a dimensionality of objects, point-of-view, and/or view parameters. One or more of the view parameters may be selectable by the user.

The instance of the virtual space may com rise a simulated space that is accessible by users via clients (e.g., client computing platforms 104) that presents the views of the primary virtual space to a user. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer modules may be synchronous, asynchronous, and/or semi-synchronous.

The above description of the manner in which views of the virtual space are determined by primary space module 106 is not intended to be limiting. The primary space module 106 may be configured to express the virtual space in a more limited, or more rich, manner. For example, views determined for the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other representations of individual places within the virtual space are contemplated.

Within the instance of the virtual space executed by space module 106, users may control characters, objects, simulated physical phenomena (e.g., wind, rain, earthquakes, and/or other phenomena), and/or other elements within the virtual space to interact with the virtual space and/or each other. The user characters may include avatars. As used herein, the term "user character" may refer to an object (or group of objects) present in the virtual space that represents an individual user. The user character may be controlled by the user with which it is associated. The user controlled element(s) may move through and interact with the virtual space (e.g., non-user characters in the virtual space, other objects in the virtual space). The user controlled elements controlled by and/or associated with a given user may be created and/or customized by the given user. The user may have an "inventory" of virtual goods and/or currency that the user can use (e.g., by manipulation of a user character or other user controlled element, and/or other items) within the virtual space.)

The users may participate in the instance of the virtual space by controlling one or more of the available user controlled elements in the virtual space. Control may be exercised through control inputs and/or commands input by the users through client computing platforms 104. The users may interact with each other through communications exchanged within the virtual space. Such communications may include one or more of textual chat, instant messages, private messages, voice communications, and/or other communications. Communications may be received and entered by the users via their respective client computing platforms 104. Communications may be routed to and from the appropriate users through server(s) 102 (e.g., through space module 106).

In some implementations, server(s) 102, client computing platforms 104, and/or external resources 122 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platforms 104, and/or external resources 122 may be operatively linked via some other communication media.

A given client computing platform 104 may include one or more processors configured to execute computer program modules. The computer program modules may be configured to enable an expert or user associated with the given client computing platform 104 to interface with system 100 and/or external resources 122, and/or provide other functionality attributed herein to client computing platforms 104. By way of non-limiting example, the given client computing platform 104 may include one or more of a desktop computer, a laptop computer, a handheld computer, a tablet computing platform, a NetBook, a Smartphone, a gaming console, and/or other computing platforms.

The external resources 122 may include sources of information, hosts and/or providers of virtual environments outside of system 100, external entities participating with system 100, and/or other resources. In some implementations, some or all of the functionality attributed herein to external resources 122 may be provided by resources included in system 100.

Server(s) 102 may include electronic storage 124, one or more processors 126, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platform operating together as server(s) 102.

Electronic storage 124 may comprise electronic storage media that electronically stores information. The electronic storage media of electronic storage 124 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 124 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 124 may include one or more virtual storage resources (e.g., cloud storage, a virtual private network, and/or other virtual storage resources). Electronic storage 124 may store software algorithms, information determined by processor(s) 126, information received from server(s) 102, information received from client computing platforms 104, and/or other information that enables server 102 to function as described herein.

Processor(s) 126 may be configured to provide information processing capabilities in server(s) 102. As such, processor(s) 126 may include one or more of a digital processor, an analog processor, a digital circuit designed to process information, an analog circuit designed to process information, a state machine, and/or other mechanisms for electronically processing information. Although processor(s) 126 is shown in FIG. 1 as a single entity, this is for illustrative purposes only. In some implementations, processor(s) 126 may include a plurality of processing units. These processing units may be physically located within the same device, or processor(s) 126 may represent processing functionality of a plurality of devices operating in coordination. The processor(s) 126 may be configured to execute modules 106, 108, 110, 112, 114, 116, 118, 120 and/or other modules by software; hardware; firmware; some combination of software hardware, and/or firmware; and/or other mechanisms for configuring processing capabilities an processor(s) 126. As noted, in certain implementation, a given client computing platform 104 may include one or more processors that are the same or similar to processor(s) 126 of server(s) 102 to execute such computer program modules of client computing platform(s) 104.

It should be appreciated that although modules 106, 108, 110, 112, 114, 116, 118 and 120 are illustrated in FIG. 1 as being co-located within a single processing unit, in implementations in which processor(s) 126 includes multiple processing units, one or more of modules 106, 108, 110, 112, 114, 116, 118, 120 and/or other modules may be located remotely from the other modules. The description of the functionality provided by the different modules 106, 108, 110, 112, 114, 116, 118, 120 and/or other modules described below is for illustrative purposes, and is not intended to be limiting, as any of module 106, 108, 110, 11 114, 116, 118, 120 and/or other modules may provide more or less functionality than is described. For example, one or more of modules 106, 108, 110, 112, 114, 116, 118, 120 and/or other modules may be eliminated, and some or all of its functionality may be provided by other ones of modules 106, 108, 110, 112, 114, 116, 118, 120 and/or other modules. As another example, processor(s) 126 may be configured to execute one or more additional modules that may perform some or all of the functionality attributed below to one of modules 106, 108, 110, 112, 114, 116, 118, 120 and/or other modules.

The primary account module 110 may be configured to manage accounts of users related to the primary virtual space. The accounts of the users may include a first primary user account associated with a first user, wherein the first primary user account may include inventory information for the first user which indicates virtual items available to the first user in the primary virtual space.

The event space module 110 may be configured to execute an instance of an event space. The instance of the event space may be a game space. The instance of the event space may comprise a simulated space that is accessible by users via clients (e.g., client computing platforms 104) that present views of the event space to a user. The event space may have a topography, express ongoing real-time interaction by one or more users, and/or include one or more objects positioned within the topography that are capable of locomotion within the topography. In some instances, the topography of the event space may be two-dimensional. In other instances, the topography may be three-dimensional. The event space may be similar to or the same as the primary virtual space. The event space may be a simplified version of the primary virtual space wherein one or more functions, objections and/or other elements of the primary virtual space are unavailable in the event space. The event space may have a reduced run-time compared to the primary virtual space. In some instances, the event space may be a mini-game, a virtual game, and/or may be any other game format.

The event space module 110 may be configured to implement the instance of the event space to facilitate interactions of the users with the event space and/or each other during an event period by performing operations in the event space in response to commands received from the users. An event period may be the duration of time that the event space is available to the users of the primary virtual space. At the expiration of the event period the event space may no longer be available to the users of the primary virtual space. The event period may be any time period. For example, the event period may be an hour, where the event space is associated with a player-versus-player tournament or deathmatch style game. As another example, the event period may be on or more weeks, where the event space is associated with a quest, or extended challenge.

The event space may comprise one or more event objectives. Event objectives may include one or more of player-versus-player objectives, player-versus-environment objectives, and collecting and/or harvesting objectives. Player-versus-player event objectives may include total number of kills, defeating other users, obtaining specified values of game parameters, such as might or power, and/or other player-versus-player event objectives. Player-versus-environment objectives may include total number of non-player character kills, defeating one or more specified non-player characters, obtaining specified values of game parameter, and/or other player-versus-environment event objectives. Harvesting objectives may include obtaining a specified amount of a resource by harvesting, gathering, cultivating or other methods for obtaining in-game resources.

The virtual items available to the first user in the primary virtual space may be unavailable to the first user in the event space. The users competing against each other in the event space, may have different game parameters in the primary virtual space. For example, a user in the primary virtual space may have an associated character having advanced offensive and/or defensive parameters, providing an advantage to the user in the primary virtual space over other users that do not have advanced offensive and/or defensive parameters, Players having characters advanced offensive and/or defensive parameters may have played the game in the primary virtual space for a long time or may have made a large number of purchases of virtual items and/or currency in the primary virtual space to obtain the advanced offensive and/or defensive parameters. When the user with the advanced character enters the event space, any advantage that the character may have over users with less advanced characters may not be provided. Advanced weaponry, available to the user in the primary virtual space, may not be made available to the user in the event space. As such, a user having an advanced character in the primary virtual space is placed on a level playing-field, in the event space, with newer or less skilled users, who have less advanced characters in the primary virtual space.

Users may be provided the opportunity to gain advantages over other users of the event space by making purchases of virtual items and/or currency, For example, users may be provided the opportunity to make purchases of weaponry or armor for their character in the event space, Users may be prohibited from using virtual currency associated with the primary virtual space, that they have purchased, to make purchases of virtual items to be used in the event space, Users may be required to make purchases of virtual currency associated with the event space in order to make purchases of virtual items associated with the event space. As such an opportunity to generate additional revenue from users is provided.

Access to the event space may be limited to a subset of users of the primary virtual space. For example, the event space may only become available to the users of the primary virtual space upon an indication that the users of the primary virtual space have breached a specified threshold. The event space module may be configured to implement the instance of the event space upon an indication that the first user has reached a specified level in the primary virtual space. The specified threshold may be any parameter associated with the user and/or the game. For example, the specified threshold may include: total points or total score of the user in the primary virtual space; accomplishment of one or more quests within the primary virtual space; obtaining a specified amount of one or more virtual items in the primary virtual space; the amount of virtual currency purchased by the user; the total amount of real currency spent by the user in the game; an area of the game map unlocked or explored by the user; association with one or more alliance, guilds or groups; an indication that the user belongs to one or more social networks, or is a member of one or more social network groups; and/or other game and/or user parameters.

The event account module 112 may be configured to manage accounts of users related to the event space. The user accounts may include a first event user account associated with the first user, wherein the first event user account indicates a set of event user parameters for the first user, a set of event game parameters for the first user, and event inventory information. The event inventory information may indicate virtual items available to the first user in the event space. The event user parameters may include an association of the first event account with the first primary user account. The virtual items available to the first user in the event space may be different than the virtual items available to the first user in the primary virtual space.

The event transaction module 114 may be configured to facilitate purchase of event virtual items useable in the event space. The event transaction module 114 may be configured to facilitate purchase of event virtual currency useable in the event space. The event inventory information may reflect the availability of the event virtual item to the first user in the event space, in response to the purchase of an event virtual item in the event space by the first user. The event virtual items available to the first user in the event space may be unavailable to the first user in the primary virtual space. Upon the expiration of the event space, the event virtual items may also expire. The event account, associated with the first user, may be made inaccessible by the first user, or may be deleted from the one or more server(s) 102. All event virtual items indicated as available by the first user in the event inventory information may be used only in the event space, in furtherance of achieving the one or more specified objectives. The one or more event virtual items may provide an advantage to the first user over users who have not purchased any of the one or more event virtual items. For example, an event virtual item may be armor for the first user's event space character, where the armor provides more advanced defensive properties to the character. As another example, an event space virtual item may be a virtual item to facilitate the gathering or harvesting of resources within the event space.

The event assessment module 116 may be configured to determine the progress of the users with respect to the one or more event objectives. The event assessment module may be configured to determine event rewards to be awarded to individual ones of the users based on the progress of the individual users with respect to the one or more event objectives. The event rewards may be usable in the primary virtual space. The event rewards may be unavailable for use by the first user in the event space. Examples of event rewards may include: virtual currency usable in the primary virtual space; virtual items usable in the primary virtual space to provide the first user with an advantage in the primary virtual space; primary virtual game spaces previously unavailable to the first user; characters previously unavailable to the first user; access to one or more guilds or alliances; higher ranking on one or more leaderboards; and/or other rewards for use in the primary virtual space.

The reward distribution module 118 may be configured to distribute event rewards to the users in the primary virtual space. The event inventory information in the first primary account may be updated to reflect the availability to the first user in the primary virtual space of one or more virtual items included in the first event reward, in response to the determination of a first event reward for the first user. The rewards awarded to the first user during the event period in the event space may be distributed to the first user for use in the primary virtual space upon expiration of the event period, such that, in response to expiration of the event period, the primary account module 108 may be configured to modify the inventory information for the first user to indicate the availability of the event reward for use by the first user in the primary virtual space. The rewards awarded to the first user during the event period may be distributed to the first user for use in the primary virtual space when the first user receives the reward in the event space, such that the primary account module 108 may be configured to modify the inventory information for the first user to indicate the availability of the event reward for use by the first user in the primary virtual space.

Upon an expiration of the event period, the event space may become unavailable to the users, and event items purchased by the users in the event space during the event period may be forfeit, such that the event account module 112 may be configured to update the event inventory information for the first user to reflect removal of the availability of the event virtual item(s), in the event space to the first user, upon expiration of the event period. Event virtual currency purchased by the first user during the event period may become forfeit upon the expiration of the event period, such that the event account module 112 may be configured to update the event inventory information for the first user, to indicate the unavailability of the event virtual currency.

The event configuration module 120 may be configured to facilitate entry and/or selection by an administrator of one or more of: one or more event objectives; one or more virtual items available to the first user in the event space; and/or one or more event rewards available for awarding to the individual users based on progress of the individual users with respect to one or more event objectives; and other parameters for the event space. The event configuration module may be configured to facilitate entry and/or selection of an event period, during which the event space will be available to users of the primary virtual space. The event configuration module 120 may be configured to facilitate entry and/or selection by an administrator of one or more parameters to selectively provide access to users. For example, the administrator may enter and/or select that: users must be a member of a specified alliance of guild before the particular event space becomes available to the user; users must have breached a specified threshold within the main game; users must have spent a specified amount of real currency in the game; and/or other game parameter for the uses.

Users of the event space may be incentivized to make purchases of event items using real currency by requiring users to make a purchase(s) of event items before becoming eligible to receive an event reward. As such, the event configuration module may be configured to facilitate selection and/or entry by the administrator of an amount of real currency required to be spent on event items before the first user is eligible to receive the one or more event rewards. The amount of real currency required to be spent by users may vary in response to an indication of the user's propensity to purchase virtual items with real currency. For example, if the primary user account of the first user indicates that the first user spends a relatively large amount of real currency on virtual items, the amount of real currency required to be spent by the first user before becoming eligible to receive an event reward may be greater than for second user, where the primary user account of the second user indicates that the second user spends a relatively low amount of real currency on virtual items.

Users of the event space may be incentivized to make purchases of virtual event items in the event space, using real currency, by accelerating the users' progress toward achieving the objective upon a purchase of a virtual event item with real currency. The event assessment module may be configured to determine the progress of the users with respect to one or more event objectives, wherein the event assessment module may determine that the first user has progressed further toward the one or more event objectives in response to a purchase of one or more virtual items by real currency.

The event transaction module 114 may be configured to determine a user cost to the first user for individual ones of the event items based upon a purchase history of the first user as indicated in the primary user account for the first user. As such, the event items, available to the first user in the event space for purchase with real currency may be differentially priced depending on a users willingness to make purchases of virtual items with real currency. For example, a first user having a primary user account indicating that the first user has a propensity to make purchases of virtual items with real currency may be presented with a higher price, in virtual or real currency, for the virtual item in comparison to a second user having a primary user account indicating that the second user does not have a propensity to make purchases of virtual items with real currency.

Figure 2:
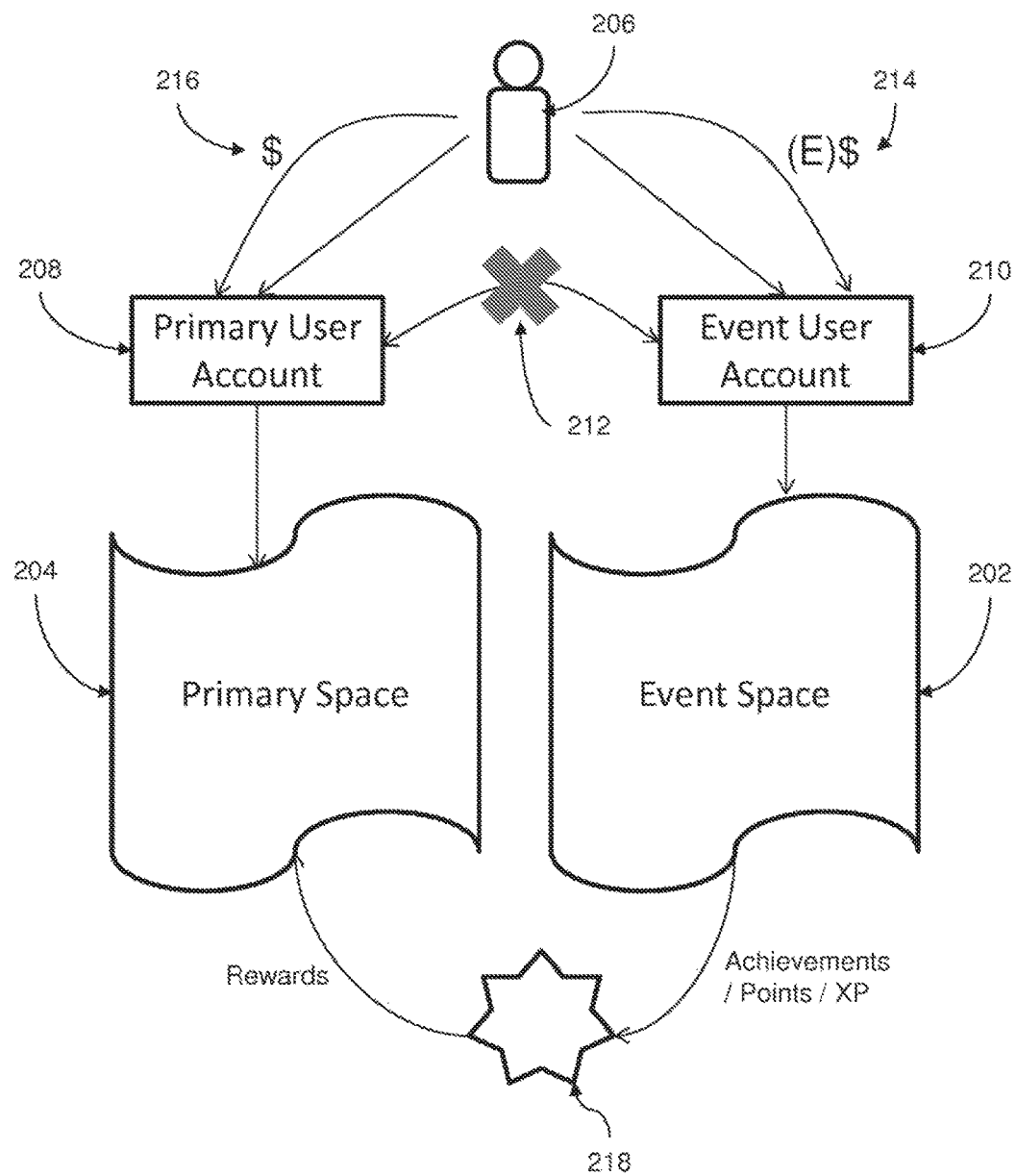
FIG. 2 conceptually illustrates providing an event space associated with a primary virtual space, in accordance with one or more implementations.

FIG. 2 conceptually illustrates providing an event space 202 associated with a primary virtual space 204, in accordance with one or more implementations. A user 206 may have a primary user account 208 associated with the primary virtual space 204, and an event user account 210 associated with the event space 202.

The primary user accounts 208 may include information stored by server(s) 102, one or more of the client computing platforms 104, and/or other storage locations. The primary user accounts 208 may include, for example, information identifying users 206 (e.g., a username or handle, a number, an identifier, and/or other identifying information) within the primary virtual space 204, security login information (e.g., a login code or password), primary virtual space account information, subscription information, virtual currency account information (e.g., related to currency held in credit for a user), relationship information (e.g., information related to relationships between users in the virtual space), primary virtual space usage information, demographic information associated with users, interaction history among users in the primary virtual space, information stated by users, purchase information of users, browsing history of users, a client computing platform identification associated with a user, a phone number associated with a user, and/or other information related to users.

The information included in the primary user accounts 208 may include character information for the user 206. For a given user, the primary user account 208 may include character information for one or more characters that are associated with the user 206 in the primary virtual space 204. The one or more characters may be persistent within the primary virtual space 204. The on or more characters may be controllable by the given user in the primary virtual space 204. Controlling the one or more characters may enable the given user to advance within the online game (e.g., as the characters progress through the game content available in the virtual space). The given user 206 may be able to control a plurality of the characters within the primary virtual space 204 simultaneously. The given user 206 may only be able to play one of the characters in the online game in the primary virtual space 204 at a time. Individual ones of the one or more characters may be unique within the primary virtual space 204 (e.g., have a unique appearance, a unique name, a unique score or inventory, and/or be unique in other ways). The character(s) for which character information is saved in the user profile of the given user may be exclusive to the given user 206. That is, the given user 206 may be the only user that controls those character(s). The character information included in the primary user account 208 for a given character may include one or more of a progress level, a status, a score, an inventory, and/or other information.

The event user account 210 may similarly include information stored by server(s) 102, one or more of the client computing platforms 104, and/or other storage locations. The event user account 210 may include information relating to the user 206 and the event space 202, similar to that contained in the primary user account 208 relating to the primary virtual space 204. The event user account 210 may include identifying information for the user 206, the same as, or similar to, the identifying information for the user 206 contained in the primary user account 208, facilitating the link between the primary user account 208 and the event user account 210 of the user 206. The event user account 210 may also include the interaction history of the user 206 in the event space 202, including event virtual currency held in credit for the user 206, relationships of the user 206 in the event space 202, and other information related to users 206 similar to that held in the primary user account 208.

The event user account 210 may contain information related to one or more characters of the user 206 in the event space 202. The character in the event space 202 may have the same or similar parameters as the character in the primary space 204. The character for the user 206 in the event space 202 may be a limited version of the character for the user 206 in the primary surface 204, or may be a version having reduced abilities and/or parameters compared to the primary space 204. The character for the user 206 in the event space 202 may be the same as, or similar to, the characters for other users in the event space 202 to provide characters having a normalized set of parameter across all users of the event space 202. The character information for the user 206 stored in the event user account 210 may be the same kinds, or similar kinds, of character information for the user 206 in the primary user account 208. For example, the character information included in the event user account 210 for a given character may include one or more of a progress level, a status, a score, an inventory, and/or other information.

The primary virtual space 204 may have characteristics and/or parameters the same as or similar to those disclosed above with reference to the primary virtual space executed and implemented by the primary space module 106 illustrated in FIG. 1. The event space 202 may have characteristics and/or parameter the same as or similar to those disclosed above with reference to the event space executed and implemented by the event space module 110 illustrated FIG. 1.

The primary user account 208 associated with a first user 206, may include inventory information for the first user which indicates virtual items available to the first user 206 for use in the primary virtual apace 204. The primary user account 208 and the event user account 210 associated with the user 206 may be associated by both containing an identification of belonging to the same user 206. The primary user account 208 and the event user account 210 may not permit the sharing of inventory between the user accounts. An account link 212 may not exist between the primary user account 208 and the event user account 210. The absence of the account link 212 prevents the ability of the user 206, when in the event space 202, from using virtual items obtained in the primary space 204. In this way, users in the event space 202 may enter the event space 202 having the same, or similar, properties and characteristics with respect to the performance of their user characters.

The event user account 210 associated with the first user 206, may indicate a set of event user parameters for the first user, a set of event game parameters for the first user, and event inventory information for the first user. The event inventory may indicate that availability of event virtual items to the first user 206 for use in the event space 210.

Event inventory may provide the user 206 with an advantage over other users in progressing toward achieving the one or more event objectives. The user 206 may purchase event virtual currency 214 which may be exchanged in the event space 202 for event virtual items for use within the event space 202. Event virtual currency 214 and primary virtual currency 216, available for purchase by the first user 206 in the primary virtual space, may not be transferred between the primary user account 208 and the event user account 210. Where the event space 202 has a time limit or period, all virtual items and/or event virtual currency 214 held by the event inventory associated with the first user 26 in the event user account 210 may become forfeit.

Event virtual currency 214 may be used in the event space 202 to provide an advantage to the first user 206, such that, the more virtual currency 214 purchased the greater the possible advantage obtainable by the first user 206. For example, event virtual currency 214 may be used to: open up areas of the event space 202 previously unavailable to the first user 206; purchase items previously unavailable to the first user 206; increase the level of skills associated with the first user's character; and/or increase and/or make available other game elements or parameters to provide the first user 206 with an advantage over other users in progressing toward one or more event objectives. The event virtual items may not be available to the first user 206 in the primary virtual space 204. The absence of a link or connection 212 between the event user account 210 and the primary user account 208 may prevent sharing of inventories between the user accounts. Upon expiration of the event space time limit or period, all event virtual items and event virtual currency may become forfeit.

The user 206 may accomplish achievements, gain total experience points (XP), gain specific task-based points, and/or obtain indications of a progress toward the one or more event objectives in the event space 202. Upon a determination that the user 206 has achieved a certain objective, obtained a specified and/or determined amount of task-based points and/or XP, the user 206 may receive one or more event rewards 218. Event rewards 218 may be awarded to individual ones of the users 206 based on the progress of the individual users 206 with respect to the one or more event objectives. The event rewards 218 may be usable in the primary virtual space 204. The event rewards 218 may be unavailable for use by the first user 206 in the event space 202. Examples of event rewards may include: virtual currency usable in the primary virtual space; virtual items usable in the primary virtual space to provide the first user with an advantage in the primary virtual space; primary virtual game spaces previously unavailable to the first user; characters previously unavailable to the first user; access to one or more guilds or alliances; higher ranking on one or more leaderboards; and/or other virtual items for use in the primary virtual space 204.

Upon an expiration of the event period and/or time limit of the event space 202, the event rewards 218 obtained by the user 206 in the event space 202 may be transferred to the user 206 in the primary virtual space 204, such that the inventory associated with the first primary user account 208 may be modified to indicate the availability of the event rewards 218 to the first user 206 in the primary space 204. The event rewards 218 may be virtual items usable in the primary space 204. The event rewards 218 may be unavailable for use by the first the events space 202.

Figure 3:
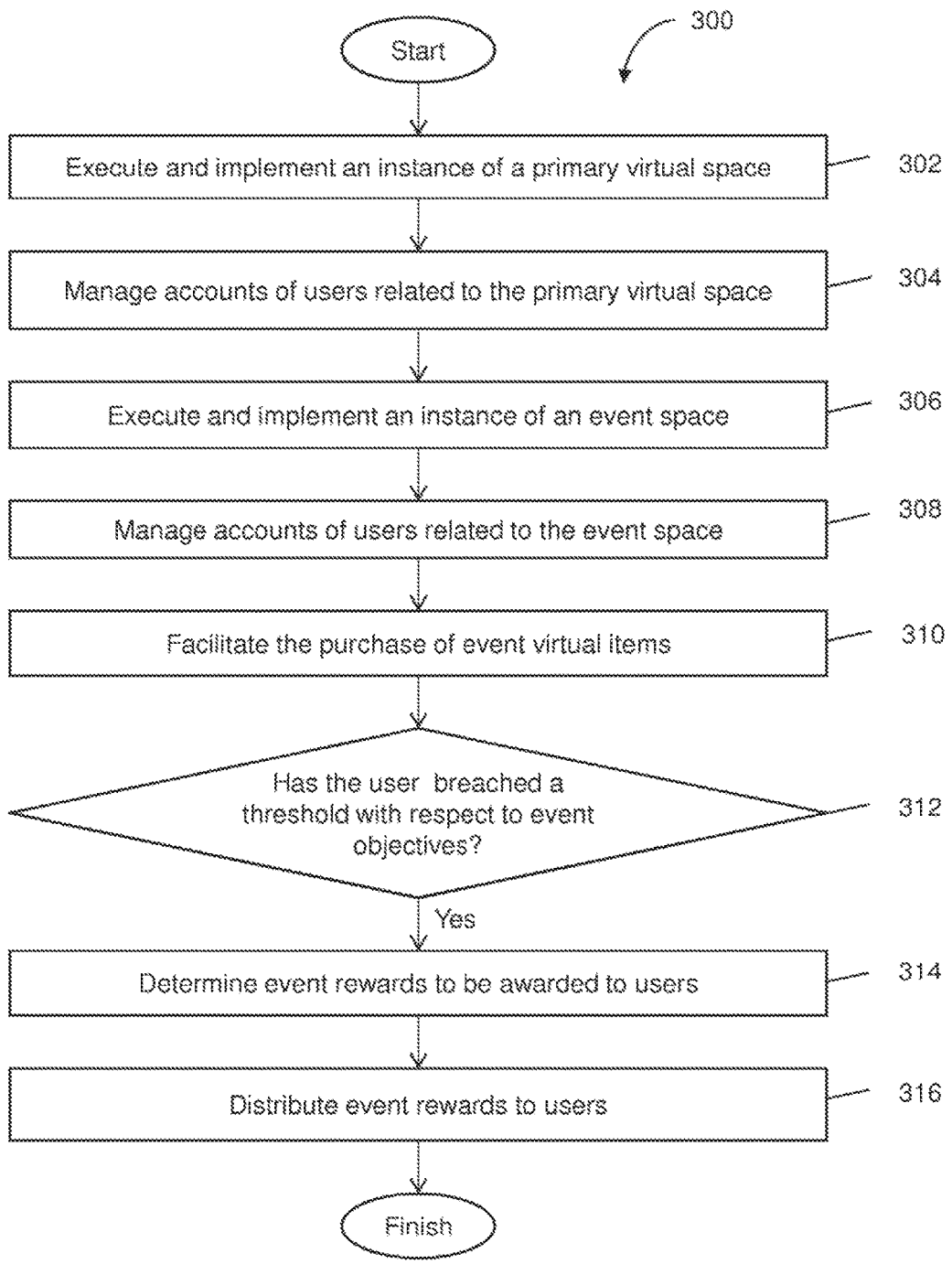
FIG. 3 illustrates a method for providing an event space associated with a primary virtual space, in accordance with one or more implementations.

FIG. 3 illustrates a method 300 for providing an event space associated with a primary virtual space, in accordance with one or more implementations. The operations of method 300 presented below are intended to be illustrative. In some implementations, method 300 may be accomplished with one or more additional operations not described, and/or without one or more of the operations discussed. Additionally, the order in which the operations of method 300 are illustrated in FIG. 3 and described below is not intended to be limiting.

In some implementations, method 300 may be implemented it one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 300 in response to instructions stored electronically on an electronic storage medium. The one or more processing devices may include one or more devices configured through hardware, firmware, and/or software to be specifically designed execution of one or more of the operations of method 300.

At an operation 302, one or more instances of a primary virtual space may be executed and implemented and a view of the primary virtual space(s) may be presented to users. At an operation 302, interactions of the users with the primary virtual space may be facilitated. Facilitation of interactions of users with the primary virtual space and/or each other may be accomplished by executing actions in the instance of the primary virtual space in response to receiving commands from the users. Operation 302 may be performed by a primary space module that is the same as or similar to primary space module 106, in accordance with one or more implementations.

At an operation 304, accounts of the users related to the primary virtual space may be managed. The accounts of the users may include a first primary user account associated with a first user, wherein, the first primary user account includes inventory information for the first user which indicates virtual items available to the first user in the primary virtual space. Virtual items available to the first user in the primary virtual space may be unavailable to the first user in the event space. Operation 304 may be performed by a primary account module that is the same as or similar to primary account module 108, in accordance with one or more implementations.

At an operation 306, one or more instances of an event space may be executed and implemented and a view of the event space(s) may be presented to users. The event space may be implemented to facilitate interactions of the users with the event space and/or each other during an event period by performing operations in the event space in response to commands received from the users. The event space may comprise one or more event objectives. The event space may be implemented in response to an indication that the first user has reached a specified level in the primary virtual space. Operation 306 may be performed by an event space module that is the same as or similar to event space module 110, in accordance with one or more implementations.

At an operation 308, accounts of users related to the event space may be managed. The accounts of users related to the event space may include a first event user account associated with the first user, wherein the first event user account may indicate a set of event user parameters for the first user, a set of event game parameters for the first user, event inventory information which indicates virtual items available to the first user in the event space, and/or other information related to the first user in the event space. The event user parameters may include an association of the first event account with the first primary user account. The virtual items available to the first user in the event space may be different than the virtual items available to the first user in the primary virtual space. The virtual items available to the first user in the event space may be unavailable to the first user in the primary virtual space. The event inventory information for the first user may reflect removal of the event virtual item in the event space to the first user upon expiration of the event period. Operation 308 may be performed by an event account module that is the same as or similar to event account module 112, in accordance with one or more implementations.

At an operation 310, the purchase of event virtual items useable in the event space may be purchased, such that responsive to purchase of an event virtual item in the event space by the first user, the event inventory information may reflect the availability of the event virtual item to the first user in the event space. A user cost to the first user for individual ones of the event items may be determined based upon a purchase history of the first user as indicated in the primary user account for the first user. Operation 310 may be performed by an event transaction module that is the same as or similar to event transaction module 310, in accordance with one or more implementations.

At an operation 312, the progress of the users with respect to the one or more event objectives may be determined. At an operation 312, a determination whether the first user has breached one or more specified thresholds with respect to progress toward achieving one or more event objectives may be determined. The thresholds may be specified by an administrator. Operation 312 may be performed by an event assessment module that is the same as or similar to event assessment module 116, in accordance with one or more implementations.

At an operation 214, event rewards may be determined that are to be awarded to individual ones of the users based on the progress of the individual users, as determined at an operation 312, with respect to the one or more event objectives. The event rewards may be usable in the primary virtual space. The event rewards may be unavailable for use by the user in the event space. Operation 314 may be performed by an event assessment module that is the same as or similar to event assessment module 116, in accordance with one or more implementations.

At an operation 316, event rewards may be distributed to the users in the primary virtual space such that responsive to determination of a first event reward for the first user at an operation 314. Operation 316 may be performed by an event distribution module that is the same as or similar to event distribution module 116, in accordance with one or more implementations.

In response to the distribution of the event rewards to the first user, at an operation 316, the inventory information in the first primary account may be updated to reflect the availability to the first user in the primary virtual space of one or more virtual items included in the first event reward. Such an operation may be performed by a primary account module that is the same as or similar to primary account module 106, in accordance with one or more implementations.

The method 300 may further comprise facilitating entry and/or selection by an administrator of one or more objectives, one or more virtual items available to the first user in the event space, one or more event rewards available for awarding to the individual users based on progress of the individual users with respect to one or more event objectives, and/or other event parameters. The method 300 may further comprise facilitating selection and/or entry by the administrator of an amount of real currency required to be spent on event items before the first user is eligible to receive the one or more event rewards. Such operations may be performed by an event configuration module that is the same as or similar to event configuration module 120, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, is to be understood that the present technology contemplates that, to the extent possible, one or more features of any implementation can be combined with one or more features of any other implementation.

What is claimed is:

1. A system for providing users with an event space associated with a primary virtual space, wherein the users include a first user, wherein the users are associated with client computing platforms, wherein the client computing platforms include a first client computing platform, wherein the client computing platforms are communicatively coupled to one or more networks, and wherein the first client computing platform is associated with the first user, the system comprising:

one or more processors configured to execute machine-readable instructions to:
execute an instance of a primary virtual space;
effectuating transmission of a first set of information over the one or more networks to the client computing platforms to facilitate a first interaction of the users with the primary virtual space and/or each other, wherein the first interaction is performed in response to receiving a first set of commands over the one or more networks from the client computing platforms;
manage accounts of the users that include a first primary user account associated with the first user, wherein the first primary user account includes inventory information that defines virtual items available to the first user in the primary virtual space;
execute an instance of an event space;
effectuating transmission of a second set of information over the one or more networks to the client computing platforms to facilitate a second interaction of the users with the event space and/or each other during an event period, wherein the second interaction is performed in response to receiving a second set of commands over the one or more networks from the client computing platforms, wherein the event space is associated with one or more event objectives;
manage accounts of the users that include a first event user account associated with the first user, wherein the first event user account includes event inventory information that defines event-specific virtual items available to the first user in the event space, wherein the first event user account is associated with the first primary user account, and wherein the event-specific virtual items are different than the virtual items available to the first user in the primary virtual space;
facilitate purchase of an event-specific virtual item that is usable in the event space such that responsive to purchase of the event-specific virtual item by the first user, the event inventory information reflects availability of the event-specific virtual item to the first user in the event space;
determine the progress of the users with respect to the one or more event objectives;
determine event rewards to be awarded to individual ones of the users based on individual progress with respect to the one or more event objectives, wherein the event rewards are usable in the primary virtual space, wherein the event rewards include a first event reward to be awarded to the first user; and
facilitate distribution of the first event reward to the first user such that the inventory information included in the first primary user account is updated to reflect availability of the first event reward to the first user in the primary virtual space; and effectuate transmission of a third set of information over the one or more networks to the first client computing platform, wherein the third set of information facilitates a presentation of reward information through the first client computing platform to the first user, wherein the presentation indicates availability of the first event reward to the first user in the primary virtual space.

2. The system of claim 1, wherein the virtual items available to the first user in the primary virtual space are unavailable to the first user in the event space.

3. The system of claim 1, wherein the event-specific virtual items available to the first user in the event space are unavailable to the first user in the primary virtual space.

4. The system of claim 1, wherein the event inventory information for the first user reflects removal of the event-specific virtual item in the event space to the first user upon expiration of the event period.

5. The system of claim 1, wherein the one or more processors are further configured to modify the inventory information for the first user to indicate the availability of the first event reward for use by the first user in the primary virtual space, in response to expiration of the event period.

6. The system of claim 1, wherein the event rewards are unavailable for use by the users in the event space.

7. The system of claim 1, wherein the one or more processors are further configured to facilitate entry and/or selection by an administrator of one or more objectives, one or more event-specific virtual items available to the first user in the event space, and one or more event rewards available for awarding to the individual users based on progress of the individual users with respect to the one or more objectives.

8. The system of claim 7, wherein the one or more processors are further configured to facilitate selection and/or entry by the administrator of an amount of real-world currency required to be spent on event-specific virtual items before the first user is eligible to receive the one or more event rewards.

9. The system of claim 1, wherein the one or more processors are further configured to implement the instance of the event space upon an indication that the first user has reached a specified level in the primary virtual space.

10. The system of claim 1, wherein the one or more processors are further configured to determine a user cost to the first user for individual ones of the event-specific virtual items based upon a purchase history of the first user as indicated in the primary user account for the first user.

11. A method for providing users with an event space associated with a primary virtual space, wherein the users include a first user, wherein the users are associated with client computing platforms, wherein the client computing platforms include a first client computing platform, wherein the client computing platforms are communicatively coupled to one or more networks, and wherein the first client computing platform is associated with the first user, the method being implemented on a computer system that includes one or more physical processors, the method comprising:

executing an instance of a primary virtual space;
effectuating transmission of a first set of information over the one or more networks to the client computing platforms to facilitate a first interaction of the users with the primary virtual space and/or each other, wherein the first interaction is performed in response to receiving a first set of commands over the one or more networks from the client computing platforms;
managing accounts of the users that include a first primary user account associated with the first user, wherein the first primary user account includes inventory information that defines virtual items available to the first user in the primary virtual space;
executing an instance of an event space;
effectuating transmission of a second set of information over the one or more networks to the client computing platforms to facilitate a second interactions of the users with the event space and/or each other during an event period, wherein the second interaction is performed in response to receiving a second set of commands over the one or more networks from the client computing platforms, wherein the event space is associated with one or more event objectives;
managing accounts of the users that includes a first event user account associated with the first user, wherein the first event user account includes event inventory information that defines event-specific virtual items available to the first user in the event space, wherein the first event user account is associated with the first primary user account, and wherein the event-specific virtual items are different than the virtual items available to the first user in the primary virtual space;
facilitating purchase of an event-specific virtual item that is usable in the event space such that responsive to purchase of the event-specific virtual item by the first user, the event inventory information reflects availability of the event-specific virtual item to the first user in the event space;
determining the progress of the users with respect to the one or more event objectives;
determining event rewards to be awarded to individual ones of the users based on individual progress with respect to the one or more event objectives, wherein the event rewards are usable in the primary virtual space, where in the event rewards includes a first event rewards to be awarded to the first user;
facilitating distribution of the first event reward to the first user such that the inventory information included in the first primary account is updated to reflect availability of the first event reward to the first user in the primary virtual space; and
effectuating transmission of a third set of information over the one or more networks to the first client computing platform, wherein the third set of information facilitates a presentation of reward information through the first client computing platform to the first user, wherein the presentation indicates availability of the first event reward to the first user in the primary virtual space.

12. The method of claim 11, wherein the virtual items available to the first user in the primary virtual space are unavailable to the first user in the event space.

13. The method of claim 11, wherein the event-specific virtual items available to the first user in the event space are unavailable to the first user in the primary virtual space.

14. The method of claim 11, wherein the event inventory information for the first user reflects removal of the event-specific virtual item in the event space to the first user upon expiration of the event period.

15. The method of claim 11, further comprising modifying the inventory information for the first user to indicate the availability of the first event reward for use by the first user in the primary virtual space, in response to expiration of the event period.

16. The method of claim 11, wherein the event rewards are unavailable for use by the users in the event space.

17. The method of claim 11, further comprising facilitating entry and/or selection by an administrator of one or more objectives, one or more event-specific virtual items available to the first user in the event space, and one or more event rewards available for awarding to the individual users based on progress of the individual users with respect to one or more objectives.

18. The method of claim 17, further comprising facilitating selection and/or entry by the administrator of an amount of real-world currency required to be spent on event-specific virtual items before the first user is eligible to receive the one or more event rewards.

19. The method of claim 11, further comprising implementing the instance of the event space upon an indication that the first user has reached a specified level in the primary virtual space.

20. The method of claim 11, further comprising determining a user cost to the first user for individual ones of the event-specific virtual items based upon a purchase history of the first user as indicated in the primary user account for the first user.

* * * * *